Figure 1:
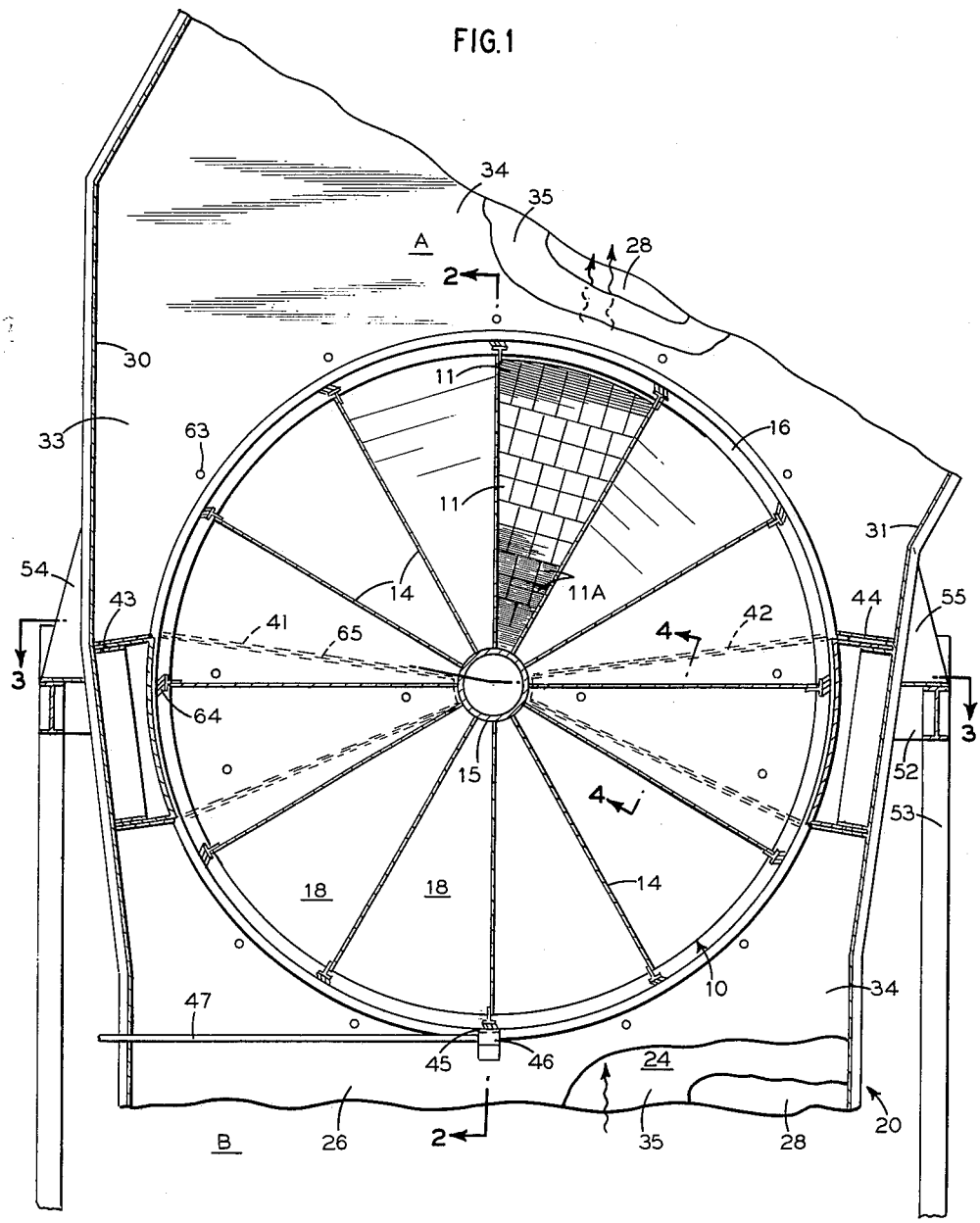

Jan. 18, 1966   A. J. GRAM, JR., ET AL   3,229,753

REGENERATIVE HEAT EXCHANGERS

Filed Jan. 7, 1963   3 Sheets-Sheet 3

United States Patent Office 3,229,753
Patented Jan. 18, 1966

3,229,753
REGENERATIVE HEAT EXCHANGERS
Arthur J. Gram, Jr., and Paul H. Koch, Wadsworth, Ohio, assignors to The Babcock & Wilcox Company, New York, N.Y., a corporation of New Jersey
Filed Jan. 7, 1963, Ser. No. 249,736
5 Claims. (Cl. 165—7)

The present invention relates to regenerative heat exchangers, and more particularly to regenerative heat exchangers of the type wherein a heat exchange media is rotated through a heating zone where the media is heated by contact with a relatively hot gas and the media is then rotated through a cooling zone where the media is cooled in giving up its heat to a relatively cool gas which is heated thereby.

Regenerative heat exchangers involving the use of rotating segmented drums or disks containing a matrix of heat exchange surfaces are well known. Such heat exchangers are usually constructed so that the matrix is alternately absorbing heat from a relatively hot gas and yielding the heat to a relatively cold gas during each rotation of the segmented drum. The separation of the relatively hot and cold gases in the heat exchanger is attained by the use of stationary dividers provided with sealing devices contacting the moving surfaces of the drum. The effectiveness of a heat exchanger is largely dependent upon the efficiency of the sealing devices where the seals must be capable of compensating for the thermal movement and distortion of the drum during the start-up and shut-down periods, and during normal operation of the heat exchanger.

In the present invention, a regenerative heater is provided with a cylindrical rotor assembly where the rotor is formed with a plurality of radially extending imperforate plates or partitions circumferentially spaced about a shaft supporting the rotor for rotation. The heat exchange media is positioned as axially spaced disk-like members on and perpendicular to the shaft of the cylindrical rotor assembly. The disk-like members are mounted in the segments between the partitions and extend substantially throughout the radial extent of the segments. The stationary housing enclosing the rotor is supplied with adjustable divider elements positioned adjacent the opposite ends of the rotor so that the flow paths of the heating gas and the gas to be heated are separated and effective heat exchange between the gases is attained. The flow paths of the gases through the heater are so directed as to drastically reduce the distortion usually encountered in regenerative heat exchangers and to thereby reduce heat losses resulting from interflow of gases as caused by leakage through the seals between stationary and moving parts of the heater. This is accomplished, at least in part, by introducing one of the gases into the rotor for axial flow in opposite directions through a portion of the heat exchange media positioned in spaced adjacent disk-like members while simultaneously the second gas passes axially of the rotor in directions opposite to that of the first gas flow directions through another portion of the heat exchange media in spaced adjacent disk-like members.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which a preferred embodiment of the invention is illustrated and described.

Figure 2:
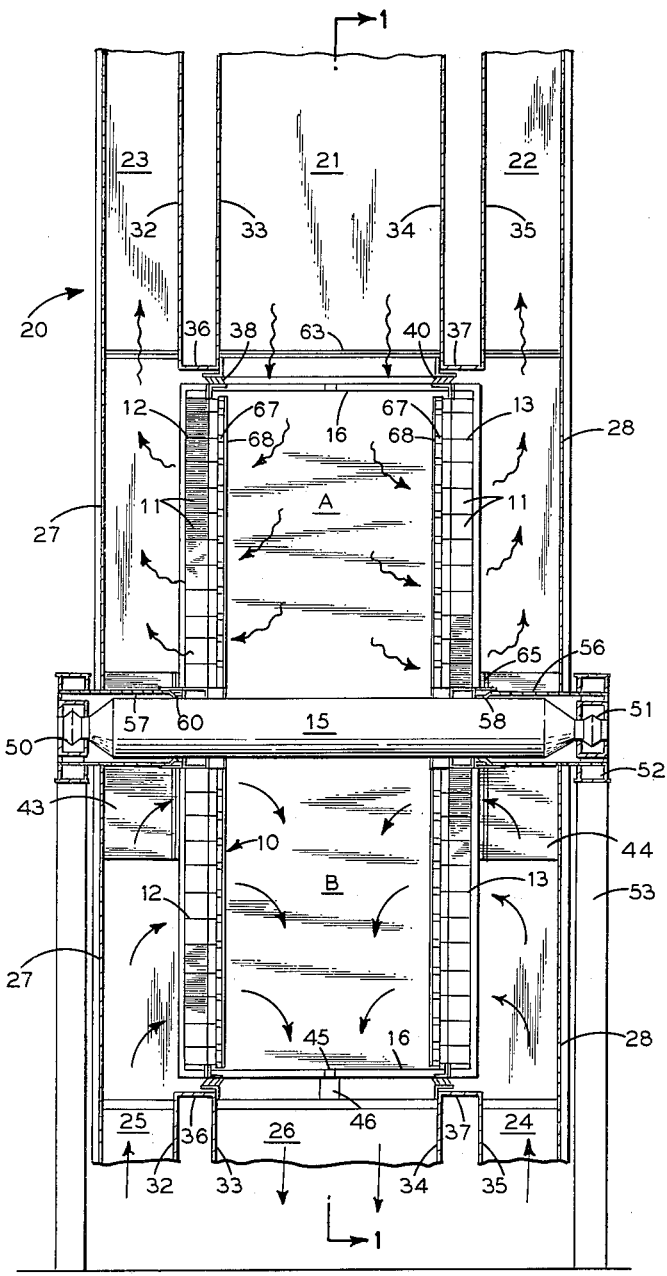
Figure 3:
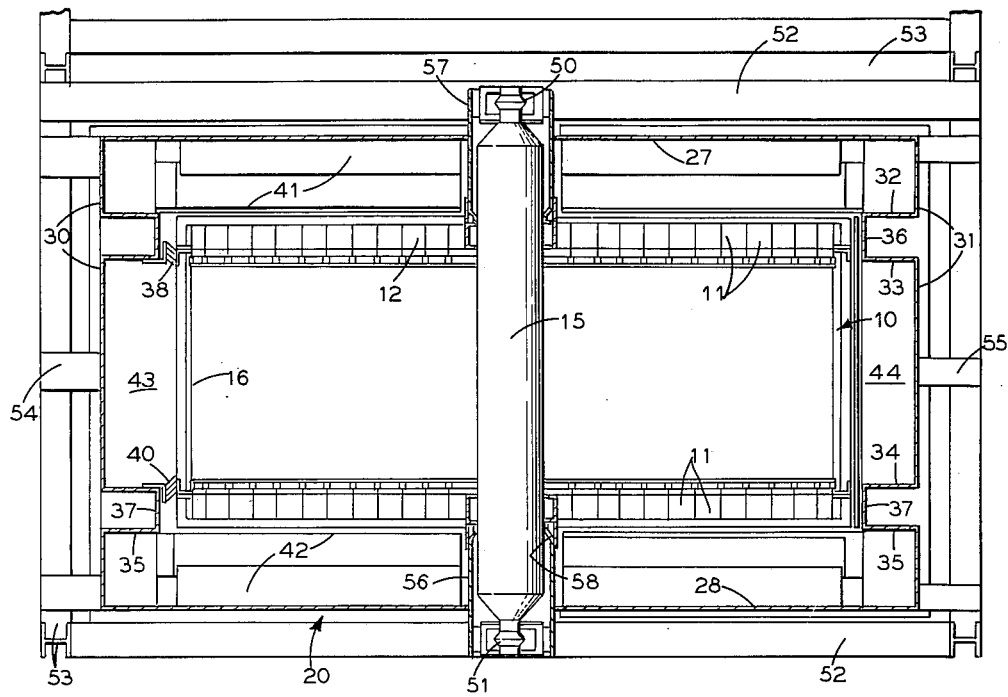
Figure 4:
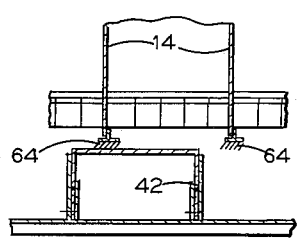
Figure 6:
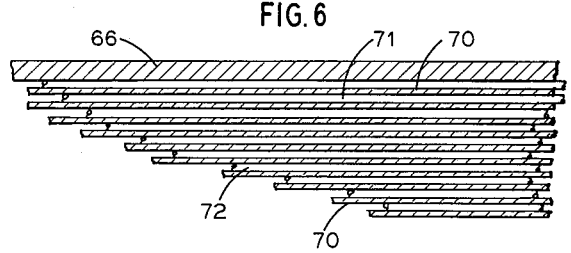
Figure 5:
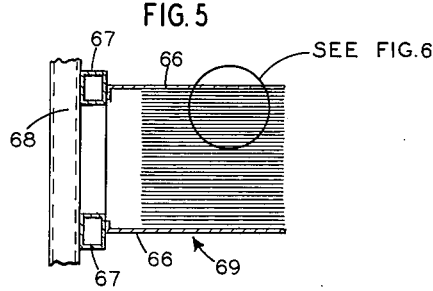

Of the drawings:
FIG. 1 is an end elevation, partly in section, of a regenerative heat exchanger constructed and arranged in accordance with the invention;
FIG. 2 is a side elevation, partly in section of the invention shown in FIG. 1, taken on line 2—2 of FIG. 1;
FIG. 3 is a section of the heater taken on line 3—3 of FIG. 1;
FIG. 4 is a section taken on line 4—4 of FIG. 1;
FIG. 5 is an enlarged view of a heat exchange cell and its supporting structure; and
FIG. 6 is a further enlarged view of the heat exchange elements in the cell of FIG. 5.

In the illustrated embodiment of the invention shown in FIGS. 1, 2 and 3, the regenerative air heater is constructed with a unitary generally cylindrical rotor assembly 10 having the heat exchange media 11 arranged as a pair of axially spaced disk-like members or masses of heat transfer elements 12 and 13 mounted adjacent the opposite ends of the rotor. As shown, the rotor assembly is constructed with a series of circumferentially equally spaced radial partitions 14 which extend outwardly from shaft 15 to the outer diameter of the rotor assembly 10. The outer circumference of the rotor is generally open as at 16 so as to provide a radial flow path for gases entering or leaving the segmental compartments or segments 18 of the rotor assembly formed by the partitions 14.

The rotor assembly 10 is mounted for rotation within a housing 20 which encloses the rotor assembly 10 and cooperates therewith to provide passageways for the flow of a heating gas and of a gas to be heated through the heat exchange media 11 mounted in the disk-like masses 12 and 13. As shown particularly in FIGS. 1 and 2, the upper portion of the housing is provided with an inlet duct 21 and a pair of outlet ducts 22 and 23 for the flow of the heating gas, while the lower portion of the housing is provided with a pair of inlet ducts 24 and 25 and an outlet duct 26 for the flow of the gas to be heated. As hereinafter described, the flow of the heating and the heated gases through the regenerator is effectively separated and countercurrent in flow direction through the heat exchange media 11 for high efficiency heat transfer.

The housing is provided with end plates 27 and 28, and side plates 30 and 31 which are interconnected to accommodate the inlet and outlet ducts, and to enclose the rotor assembly. Annular plates 32, 33, 34 and 35 are positioned generally parallel to the end plates 27 and 28, with pairs of plates generally in alignment with the peripheral edges of the disk-like members 12 and 13. The inner circumferential edge of plates 32 and 33 is connected by a cylindrical band 36 parallel to the axis of shaft 15 and closely radially spaced from the periphery of the disk-like member 12. In a similar manner, the inner circumferential edges of plates 34 and 35 are connected by a cylindrical band 37 adjacent the peripheral edge of disk-like member 13. Suitable circumferential sealing means 38 and 40 are positioned between the periphery of the disk-like members 12 and 13, and the bands 36 and 37, respectively, to prevent leakage between the gas inlets and outlets adjoining the rotating parts of the regenerator. In the construction described the plates 27 and 32, and the plates 35 and 28 define the side walls of the ducts 23 and 25, 22 and 24, respectively, while the plates 33 and 34 define the side walls of the ducts 21 and 26.

Two radial sector plates 41 and 42 are positioned on opposite sides of the shaft 15 and at the opposite ends of the rotor assembly. The sector plates are attached to the housing 20 and each cooperate with an axial sealing structure 43 and 44 respectively, to separate the heating gas and the gas to be heated during their flow through the regenerator. Each of the sector plates has an angular extent equal to or greater than the angle of a sector formed between adjacent partitions 14 of the rotor assembly. The structures 43 and 44, and the radial plates 41 and 42 cooperate with both ends of the rotor assembly to divide the housing into separate portions for the separate flow of the gases therethrough. In effect, the combination of the seals and the housing with the rotor assembly separates the regenerator into an upper chamber A for the flow of the heating gases therethrough and a lower chamber B for the flow of the gases to be heated.

It will be understood that the angular extent of the regenerator chambers A and B may be varied from that shown in the drawings merely by shifting the angular position of the plate 42 relative to the plate 41 on both ends of the rotor assembly. It will also be understood that the gas inlets and outlets need not be vertical, but can be shifted about the axis of the rotor to most advantageously cooperate with the location of the source of heating gas and the location for the use of the heated gas.

In the embodiment of the invention shown in FIGS. 1 to 3 the heating gas, which may be hot flue gas, enters the chamber A through the duct 21, passes radially into the segmental compartments 18 formed by the partitions 14 to pass axially of the shaft 15 through the disk-like members 12 and 13 and discharges through the ducts 22 and 23. Simultaneously the gas to be heated, which may be combustion air, enters the chamber B through the ducts 24 and 25 to pass axially of the shaft 15 through the segmental compartments of disk-like members 12 and 13, and then passes radially outwardly through the duct 26. The direction of heating gas flow is countercurrent with respect to the flow of the gas to be heated for most effective use of the heat exchange media 11.

As will hereinafter be apparent, the flow directions of both the heating and heated gases hereinbefore described are advantageous since the higher temperature gases passing through the regenerator are located between the disk-like members 12 and 13 while the cooler gases will be passing between a disk-like member and an adjacent wall of the housing. Insofar as heat exchange efficiency is concerned the directions of gas flows can be reversed without harm, so that the hotter gases would be adjacent the outer walls of the housing. However from a practical standpoint, it is advantageous to have the cooler gases confined to the outer flow channels of the housing to reduce radiation losses, and to protect the bearings supporting the shaft 15.

With the gas flows as described, the rotating rotor structure, 16, between the disk-like masses, 12 and 13, will substantially assume a uniform temperature which is an average between the flue gas entering and heated air leaving, and will swing but slightly during each rotation. Thus the rotor is relieved of temperature gradients which would distort its shape. The major temperature gradients that do occur are through the relatively shallow heat transfer elements, 11, occurring parallel to the axis, in the direction of flow. But this gradient occurs on the outer edges of the rotor, 16, and has little or no distortion effect on the major rotor structure. This construction results in maintaining substantially parallel alignment between the radial, 41 and 42, and axial, 43 and 44, seal plates, and the moving seal edges of the rotor, effecting more efficient sealing.

As shown in the drawings, the shaft 15 of the rotor assembly is mounted for rotation in fixed bearings 50 and 51 positioned outwardly adjacent the exterior wall plates 27 and 28 of the housing. The bearings are mounted on structural steel work, such as horizontally disposed members 52 which are in turn supported by transverse and upright beams, indicated generally at 53. The bearing supports are attached to the exterior walls of the housing 20 and ties 63 so that thermal expansion of the shaft and of the housing axially of the shaft occurs simultaneously with both of the bearings 50 and 51 moving outwardly on the members 52 from a fixed position at the midpoint housing support brackets 54 and 55. Such structure tends to minimize relative movement between the stationary and rotating parts of the heat exchanger, as for example, between the rotor assembly ends and the radial segment plates 41 and 42. The cylindrical rotor assembly 10 may be driven by any suitable means, such as shown in FIGS. 1 and 2, where a ring gear 45 encircling the assembly engages a worm gear 46 mounted on a tranverse drive shaft 47 which may be driven by an electric motor (not shown).

The shaft 15 rotates with the cylindrical rotor assembly, with the opposite ends of the shaft enclosed by stationary cylindrical sleeves 56 and 57 which are attached to the housing plates 28 and 27 respectively. The inner ends of the sleeves are provided with suitable circumferential seals 58 and 60. The circumferential sealing means 38 and 40, positioned on the ends of the partitions 14, prevent by-passing of the gases around the masses of heat transfer elements 12 and 13. Additional peripheral seal means 64 are positioned throughout the longitudinal and radial extent of each partition 14 to engage the structural members 41, 42, 43 and 44, to thereby separate the chambers A and B. All of the seals, or the plates with which they are in contact, may be adjusted to compensate for differential expansion and for wear.

To minimize distortion of the regenerative heater it is desirable to maintain the dimensions of the rotor assembly and heat exchange media as small and compact as possible. Advantageously, the heat exchange media can be constructed to obtain a maximized rate of heat transfer to and from the media by proportioning the gas flow channels to attain laminar or streamline flow of the gases therethrough. It has been found that multiple parallel metal plates each of .021" thickness, arranged in units or packs 69 (see FIGS. 5 and 6) with interplate spacing of the order of double the plate thickness provides the high efficiency and compact heat exchange surfaces. The packs of plates, say 12" x 12", 69 may be assembled in 12-inch deep units or cells enclosed at the top and bottom, and opposite sides, by a structural envelope 66 supported from transverse members 67 and 68 positioned between the partitions 14 of the rotor assembly 10. As arranged in the rotor assembly the opposite ends of the pack are open for gas flow through the heat exchange media 11 in a direction parallel to the axis of shaft 15. In the enlarged showing of the heat exchange media 11 includes (FIG. 6) the plates 70 which are spaced apart by rods, dimples or wire 71 to form a substantially uniform thickness of interplate spaces 72 for the flow of gases. It will be understood that some of the packs 69 may be constructed with a trapezoidal cross-section as at 11a in FIG. 1 so that the mass of heat transfer elements positioned within the segmental compartments formed by the partition plates can present the maximum possible surface to the gases passed through the disk-like members 12 and 13.

Experience has shown that heat transfer media constructed and arranged as described has highly efficient heat transfer characteristics and can be effectively maintained in a clean condition by the use of soot blowers (not shown). Due to the heat exchange efficiency of the streamline flow through the packs 69, the thickness of the mass can be even less than the 12 inches shown and described when the temperatures of the gas and air are less than that described. Moreover the diameter of the disk-like masses can be less than the diameters heretofore in use in rotary regenerators for comparable heat transfer. Under such conditions the problems of distortion and thermal change within the regenerator are greatly reduced with an advantageous reduction in the loss of heat exchanger effectiveness due to seal leakage between the heating gas and the gas to be heated.

While in accordance with the provisions of the statutes we have illustrated and described herein the best form and mode of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

What is claimed is:

1. A regenerative heat exchange device having a substantially cylindrical unitary rotor assembly rotatable about its longitudinal axis, substantially imperforate radial partitions extending substantially throughout the length of said rotor assembly and rotatable therewith, said partitions being arranged to divide said rotor assembly into a circumferential series of sector shaped compartments extending substantially the full radial dimension of said rotor assembly, walls defining a stationary housing surrounding the rotor assembly, sealing means mounted on said housing arranged in the spaces between opposite sides and ends of said rotor assembly and the adjacent walls of said housing and separating circumferentially spaced openings for the flow of a heating gas and a gas to be heated through separate groups of the rotor compartments, means for mounting axially spaced masses of heat transfer elements in said rotor compartments and extending substantially throughout the radial dimension of said sector shaped compartments, said axially spaced masses defining perforate sides of a pair of gas flow chambers therebetween at opposite sides of said rotor assembly, said chambers being separated by successive radial partitions cooperating with said sealing means during rotation of said rotor assembly to minimize gas flow between said chambers, means for conducting one of said gases initially radially inwardly through one of said chambers between adjacent masses of heat transfer elements and thence in opposite directions axially of said rotor assembly through certain compartments of the spaced masses of heat transfer elements and thence radially outwardly of said rotor assembly, and means for conducting the second gas inwardly of said rotor assembly and thence initially in opposite axial directions through other compartments of the spaced masses of heat transfer elements and thence radially outwardly in a combined stream through the second of said chambers.

2. A regenerative heat exchange device having a substantially cylindrical unitary rotor assembly rotatable about its longitudinal axis, substantially imperforate radial partitions extending substantially throughout the length of said rotor assembly and rotatable therewith, said partitions being arranged to divide said rotor assembly into a circumferential series of sector shaped compartments extending substantially the full radial dimension of said rotor assembly, walls defining a stationary housing surrounding the rotor assembly, sealing means mounted on said housing arranged in the spaces between opposite sides and ends of said rotor assembly and the adjacent walls of said housing and separating circumferentially spaced openings for the flow of a heating gas and a gas to be heated through rotor compartments, means for mounting axially spaced masses of heat transfer elements in said rotor compartments and extending substantially throughout the radial dimension of said sector shaped compartments, said axially spaced masses defining perforate sides of a pair of gas flow chambers therebetween at opposite sides of said rotor assembly, said chambers being separated by successive radial partitions cooperating with said sealing means during rotation of said rotor assembly to minimize gas flow between said chambers, means for conducting said heating gas initially radially inwardly through one of said chambers between adjacent masses of heat transfer elements and thence in opposite directions axially of said rotor assembly through certain compartments of the spaced masses of heat transfer elements and thence radially outwardly adjacent the opposite ends of said rotor assembly, and means for conducting the gas to be heated radially inwardly adjacent the opposite ends of said rotor assembly and thence in opposite axial directions through other compartments of the spaced masses of heat transfer elements and thence radially outwardly in a combined stream through the second of said chambers.

3. A regenerative heat exchange device having a substantially cylindrical unitary rotor assembly rotatable about its longitudinal horizontal axis, substantially imperforate radial partitions extending substantially throughout the length of said rotor assembly and rotatable therewith, said partitions being arranged to divide said rotor assembly into a circumferential series of sector shaped compartments extending substantially the full radial dimension of said rotor assembly, walls defining a stationary housing surrounding the rotor assembly, sealing means mounted on said housing arranged in the spaces between opposite sides and ends of said rotor assembly and the adjacent walls of said housing and separating circumferentially spaced upper and lower openings for the flow of a heating gas and a gas to be heated through the rotor compartments, means for mounting axially spaced masses of heat transfer elements in said rotor compartments and extending substantially throughout the radial dimension of said sector shaped compartments, said axially spaced masses defining perforate sides of upper and lower gas flow chambers therebetween at opposite sides of said rotor assembly, said chambers being separated by successive radial partitions cooperating with said sealing means during rotation of said rotor assembly about its horizontal axis to minimize gas flow between said chambers, means for conducting one of said gases initially radially inwardly through the upper of said chambers between adjacent masses of heat transfer elements and thence in opposite directions axially of said rotor assembly through certain compartments of the spaced masses of heat transfer elements and thence outwardly of said rotor assembly, and means for conducting the second gas inwardly of said rotor assembly and thence initially in opposite axial directions through other compartments of the spaced masses of heat transfer elements and thence radially outwardly in a combined stream through the lower of said chambers.

4. A regenerative heat exchange device having substantially cylindrical unitary rotor assembly rotatable about its longitudinal horizontal axis, substantially imperforate radial partitions extending substantially throughout the length of said rotor assembly and rotatable therewith, said partitions being arranged to divide said rotor assembly into a circumferential series of sector shaped compartments extending substantially the full radial dimension of said rotor assembly, walls defining a stationary housing surrounding the rotor assembly, sealing means mounted on said housing arranged in the spaces between opposite sides and ends of said rotor assembly and the adjacent walls of said housing and separating circumferentially spaced openings for the flow of a heating gas and a gas to be heated through the rotor compartments, means for mounting axially spaced masses of heat transfer elements in said rotor compartments adjacent the opposite ends thereof and extending substantially throughout the radial dimension of said sector shaped compartments, said axially spaced masses defining perforate sides of a pair of gas flow chambers therebetween at opposite sides of said rotor assembly, said chambers being separated by successive radial partitions cooperating with said sealing means during rotation of said rotor assembly to minimize gas flow between said chambers, means for conducting said heating gas initially radially inwardly through one of said chambers between adjacent masses of heat transfer elements and thence in opposite directions axially of said rotor assembly through certain compartments of the spaced masses of heat transfer elements and thence radially and outwardly of the heat exchange elements at the opposite ends of said rotor assembly, and means for conducting the gas to be heated radially inwardly and outwardly of the heat exchange elements at the opposite ends of said rotor assembly and thence initially in opposite axial directions through other compartments of the spaced masses of heat transfer elements and thence radially outwardly in a combined stream through the second of said chambers.

5. A regenerative heat exchange device having a substantially cylindrical unitary rotor assembly rotatable about its longitudinal axis on a horizontally disposed shaft, substantially imperforate radial partitions extending substantially throughout the length of said rotor assembly and rotatable therewith, said partitions being arranged to divide said rotor assembly into a circumferential series of sector shaped compartments extending substantially the full radial dimension of said rotor assembly, walls defining a stationary housing surrounding the rotor assembly and including end walls generally perpendicular to the horizontally disposed shaft, bearing means engaging opposite end portions of said shaft and attached to the end walls of said housing, structural means fixedly supporting said housing intermediate its end walls for combined thermal movement of the housing and shaft axially of the shaft, sealing means mounted on said housing arranged in the spaces between opposite sides and ends of said rotor assembly and the adjacent walls of said housing and separating circumferentially spaced openings for the flow of a heating gas and a gas to be heated through rotor compartments, means for mounting axially spaced masses of heat transfer elements in said rotor compartments and extending substantially throughout the radial dimension of said sector shaped compartments, said axially spaced masses defining perforate sides of a pair of gas flow chambers therebetween at opposite sides of said rotor assembly, said chambers being separated by successive radial partitions cooperating with said sealing means during rotation of said rotor assembly to minimize gas flow between said chambers, means for conducting one of said gases initially radially inwardly through one of said chambers between adjacent masses of heat transfer elements and thence in opposite directions axially of said rotor assembly through certain compartments of the spaced masses of heat transfer elements and thence outwardly of said rotor assembly, and means for conducting the second gas inwardly of said rotor assembly and thence initially in opposite axial directions through other compartments of the spaced masses of heat transfer elements and thence radially outwardly in a combined stream through the second of said chambers.

References Cited by the Examiner

UNITED STATES PATENTS

| 2,607,564 | 8/1952 | Yerrick | 165—7 |
| 2,680,008 | 6/1954 | Karlsson | 165—8 |

FOREIGN PATENTS 138,786   8/1948   Australia.

ROBERT A. O'LEARY, *Primary Examiner.*

MEYER PERLIN, CHARLES SUKALO, *Examiners.*